Patented Mar. 1, 1949

2,463,274

UNITED STATES PATENT OFFICE 2,463,274

RECOVERY OF ROSIN ACIDS

Alfred G. Houpt, Stamford, Conn., assignor to American Cyanamid Company, New York, N. Y., a corporation of Maine No Drawing. Application September 27, 1945, Serial No. 618,986

4 Claims. (Cl. 260—97.5)

This invention relates to the separation of rosin acids, and more particularly, abietic acid, from black liquor soap or from talloel by treatment of the residue from the fatty acid soap separation.

Hertofore, the attempts to separate the components of black liquor soap or talloel have included such methods as high vacuum fractional distillations, crystallization, preferential esterification and combinations of these methods. However, these attempts have been generally unsuccessful. Among the reasons to which this lack of success may be attributed were the poor yields, general lack of sharp separation of acids, corrosion of equipment, manipulation difficulties arising from the nature of the materials treated, and the high cost of the methods used.

As described in Christmann and Houpt Patent No. 2,285,902, of which this is a continuation-in-part, it is possible to separate the fatty acids from the rosin acids of black liquor soap by a process which includes forming a hot, substantially anhydrous solution of the rosin acids with salts of fatty acids, in an organic solvent in which the salts are soluble hot but insoluble at room temperatures, and in which the rosin acids are soluble both hot and at room temperatures, cooling the solution to precipitate salts of the fatty acids, filtering off the precipitated salts and recovering the rosin acids from the solution and the fatty acids from the separated salts, if desired.

As more specifically set forth in Patent No. 2,285,902, the crude black liquor soap which may be used as the starting material is preferably treated for the removal of various impurities such as lignins and sulphur compounds by dissolving and reprecipitating the soaps from an alkaline salt solution in which the lignin and sulphur compounds remain dissolved. The purified black liquor soap may then be acidified with excess sulphuric acid and the fatty material separated as talloel, containing rosin acids as well as fatty acids.

The talloel is dissolved in a suitable solvent, such as secondary amyl alcohol. Either before or after solution, the talloel is partly neutralized with sodium hydroxide or the like in an amount sufficient to combine with the fatty acids as soaps while leaving the rosin acid free. The fatty acid soaps are separated from the solvent solution of free rosin acids by dehydrating the mixture, for example by boiling and refluxing the solvent-water azeotrope over a water trap, until the solution contains less than 1.5% by volume of removable water. Upon cooling the hot, dehydrated mixture, most of the salts, or soaps, of the fatty acids are precipitated while the rosin acids remain dissolved in the mother liquor.

As an alternative to the foregoing procedure, involving the preparation of talloel by complete acidification of the purified black liquor soap, this soap may be only partly acidified using 50% sulphuric acid or the like in an amount sufficient to liberate the rosin acids while leaving the fatty acids combined as soaps. This partial acidification may be accomplished prior to or after the addition of a suitable organic solvent such as secondary amyl alcohol but in any case the resulting mixture is then dehydrated in the presence of such solvent, by means such as azeotropic distillation, until it contains less than 1.5% by volume of removable water. The resulting hot and substantially dry solution containing both the fat and rosin, along with sufficient alkali to saponify the fatty acids, all dissolved in the organic solvent, may be separated at this point from the undissolved sludge of sodium sulphate and any insoluble non-fatty contaminants such as cellulosic fibers, by known methods, such as decantation or filtration. The fatty acid soaps are separated from the resulting hot organic solvent solution by cooling, whereupon the major proportion of the salts, or soaps, of the fatty acids are precipitated while the rosin acids remain dissolved in the mother liquor, as in the procedure involving the preparation of talloel.

The solution is preferably cooled slowly in a suitable vessel equipped with a very low-speed agitator, such as one of the anchor or gate type, which will scrape the precipitated soap from the cooling surfaces of the container but which will not grind the precipitate. The temperature is allowed to fall uniformly from the dehydrating temperature of about 120° C. to about 20° C. over a period of about 3 to 5 hours. This procedure results in the formation of a coarsely granular precipitate which will filter rapidly.

The cooled batch is then blown through a filter press by gas pressure. It should best not be pumped through because the pump agitation may disperse the soap granules and slow up the filtration. An inert gas, such as nitrogen, should preferably be used in this step as well as in all others throughout the process, since exposure of the constituents of black liquor soap to air or oxygen causes rapid oxidation resulting in darkening of the products. A weight of fresh, dry secondary amyl alcohol equal to the original amyl alcohol charge is forced through the press after the slurry to wash the rosin-containing liquors from the fatty acid soap cake. In a plate and frame press of the "through washing" design, this proportion of wash liquor is sufficient to reduce the rosin acid concentration to about 1 to 2% in the fatty acids prepared from the filter cake. As the cake in the press retains 50 to 60% of its weight of liquor containing, before washing, about 15% of rosin acids, thorough washing is desirable for a good separation of the fatty acid and rosin acid constituents.

The secondary amyl alcohol filtrate from the fatty acid soap filter cake is alkaline. Its alkalinity is largely due to the presence of unprecipitated fatty acid soaps although some rosin acid soaps may also be present. Accordingly, since it is desired to have free sulphuric acid present in the solution, an amount of acid sufficient to completely neutralize the combined alkalinity, as determined by any suitable means such as titration with acid in the presence of a suitable indicator, and to provide at least a 0.25% excess of free sulphuric acid in the final solution must be added. A 0.25% excess of free $H_2SO_4$ is sufficient for the purposes of the present process; larger amounts, i. e., up to about 5% excess, may be used if desired but are unnecessary to the process of the present invention. The alcohol filtrate is therefore charged into a lead-lined still and treated with the predetermined amount of concentrated sulphuric acid. To prevent charring, the concentrated $H_2SO_4$ should be added as a cooled solution in 4 volumes of dry amyl alcohol. Two-thirds to three-fourths of the secondary amyl alcohol can then be directly distilled off as dry alcohol with 40-50 pounds steam pressure in the still coils. This dry amyl alcohol may be used as wash liquor for the fatty acid soap filter cake. The free sulphuric acid in the boiling dry amyl alcohol solution serves a dual purpose: (1) it catalyzes the preferential esterification of any residual traces of fatty acids with the amyl alcohol so that these fatty acids can be recovered as esters along with the unsaponifiable fat and so do not contaminate the rosin acids; (2) it catalyzes the transformation of "amorphous" resinic acids to crystallizable abietic acid. The residue from this direct distillation is cooled and an equal volume of cold water or cold sodium sulphate solution is added with good agitation so as to extract and dilute the free sulphuric acid. The residual secondary amyl alcohol is then completely steam distilled out of the batch, leaving abietic acid, unsaponifiable fat and fatty acid esters. The cooling and dilution with cold water are necessary to prevent rehydrolysis of the fatty acid esters formed under the anhydrous conditions.

The rosin acid residue left from the amyl alcohol removal is denser than water and will make up the bottom layer in the still. Petroleum naphtha of boiling range 90°-130° C., and in an amount equal to the weight of secondary amyl alcohol in the original charge, is added to the warm residue with vigorous agitation. This dissolves and floats the rosin residue, after which the aqueous layer is allowed to settle and is drawn off. The free rosin acids are then extracted from the naphtha solution in an iron tank with aqueous 4% NaOH. The amount of 4% NaOH should be rather closely controlled to avoid emulsification. At 25°-26° C. the limits are 1.6 to 1.8 times that corresponding to the acid value of the naphtha solution. After thorough agitation the mixture is allowed to settle at 25°-26° C., the naphtha solution forming the upper layer and the aqueous rosin-alkali solution forming the lower layer. These layers are separated and further treated as described below.

The naphtha solution obtained in the separation is washed once with one-fourth its volume of aqueous 1% NaOH. The wash liquor is added to the aqueous rosin-alkali solution. The washed naphtha solution may be transferred to an iron still and the naphtha recovered by distillation. The still residue of neutral fat is an amber oil with a slight sweet odor. The amount obtained is about 12-15% of the talloel taken, this amount and also the composition of the material depending on the completeness of the previous fatty acid soap precipitation. Table I below gives the range of characteristics of this material.

TABLE I

*Characteristics of neutral fat*

| | |
|---|---|
| Amyl esters of fatty acids_____per cent__ | 30– 40 |
| Amyl esters of rosin acids_____do____ | 5– 10 |
| Hydrocarbons _____do____ | 20– 30 |
| Sterols _____do____ | 30– 40 |
| Acid value _____ | 2– 5 |
| Saponification value _____ | 80–120 |
| Iodine value _____ | 130–160 |

This neutral fat serves as a relatively high concentration of phytosterols, and these can be concentrated still more by saponification of this neutral fat with caustic and extraction of the phytosterols along with the hydrocarbons. The separation of the phytosterols from the hydrocarbons can be accomplished by fractional crystallization or other known methods.

The separated aqueous alkali solution of rosin acids (principally abietic acid), is washed by thorough agitation in an iron tank with an equal volume of fresh petroleum naphtha of boiling range 90°-130° C. to extract any residual neutral fat. The mixture is allowed to settle completely and the layers separated as before. The upper naphtha layer may be used to dissolve the next batch of rosin-residue from the amyl alcohol recovery. The washed aqueous layer is acidified in a lead-lined tank by adding an amount of aqueous 30% $H_2SO_4$ solution equivalent to the NaOH used in the extraction and wash solutions. The batch is thoroughly agitated and heated to about 70° C. to coagulate the precipitated rosin acids. Enough petroleum naphtha will have been retained by the batch so that the free rosin acids will float to the top as an approximately 40% solution in the naphtha. It is advisable to add a small additional amount of naphtha to increase the rate of coagulation and separation of the two layers. The lower aqueous sodium sulphate layer is drained off and can be used in the kraft pulp process. The petroleum naphtha-rosin acid layer is diluted with more petroleum naphtha to an 8-10% concentration of rosin acids and centrifuged, settled, or filtered with a little filter aid such as kieselguhr to remove the sludge of water and dark-colored, oxidized and polymerized rosin acids which are largely thrown out of solution by the dilution with petroleum naphtha. Their removal greatly lightens the color of the material. If contact of the materials with air has been minimized during the processing by the use of an inert atmosphere, the amount of this sludge obtained should be well under 1% of the talloel employed.

The clarified, 8-10% naphtha solution of rosin acids obtained by the foregoing procedure has an orange color and on complete evaporation of the naphtha yields a hard, brittle glass of crude rosin acids having the characteristics listed in the following table.

TABLE II

*Characteristics of crude rosin acids*

| | |
|---|---|
| Rosin acids (Twitchell method) | 95–98% |
| Neutral fat | 1–3% |
| Softening point of glass | 70°–80° |
| Crystallization | Rapid at 85° C. |
| Remelting point of crystals | 115°–130° C. |
| Acid value | 170–180 |
| Color of glass | G—(rosin scale) |
| Odor | Woody |

By further decolorization of the 8–10% naphtha solution of rosin acids with extractants such as furfural or resorcinol, or with activated adsorbents such as chars or clays, there is produced on evaporation of the naphtha, a glass of rosin acids having a color of "N" or better according to the rosin scale.

For example, if the last-mentioned naphtha solution is thoroughly agitated at 85–90° C. for 20 minutes with 3% of resorcinol and 0.3% of water, and then settled, drawn off from the dark sludge, washed with water to remove the small amount of dissolved resorcinol, and then evaporated, there is obtained a glass of rosin acids having a color corresponding to "N" on the rosin scale. By a second extraction of the naphtha solution, with fresh resorcinol, before evaporation the color is improved only very slightly further. Approximately 8–10% of furfural is required to produce the same degree of decolorization as the 3% of resorcinol and 0.3% of water under the same conditions. The substitution of 4% of "Darco" or 10% of acid-activated bentonite for the resorcinol and water gave rosin acid glasses of the same color (N) after removal of the adsorbent by filtration and evaporation of the naphtha.

These methods of decolorization gave recoveries of 80–85% of the rosin acids. The odor was improved as well as the color, the decolorized products having a much milder woody odor than the crude rosin acids. The other characteristics listed in Table II for the crude acids were not appreciably altered by the decolorization treatments.

The use of the activated clay was considered to be the most practical, even though larger proportions are required, because of its easy recovery and reactivation by roasting.

The rosin acid glasses prepared by the foregoing procedures differ from wood or gum rosins in having much higher abietic acid contents and very much lower non-acidic or unsaponifiable contents. Probably because of this difference they crystallize much more readily and completely than wood or gum resins. These properties of the rosin acids separated from black liquor soap or talloel by the methods described, render them a very favorable source of highly purified, crystalline abietic acid.

Two general procedures for crystallizing out the abietic acid are as follows:

(1) The petroleum naphtha is distilled from the 8–10% clear solution until the temperature of the residue reaches about 135° C. or until the residue constitutes a 50–60% solution of the rosin acids. This hot solution is then transferred to an aluminum dough mixer under an inert atmosphere and cooled to 50–60° C. At this temperature it is seeded with a few crystals of abietic acid and with slow mixing brought down to a temperature of 20°–25° C. substantially uniformly over a period of 3 to 6 hours. The mixing is continued for a further 2 hours and the thick slurry is then filtered. The bulky cake of abietic acid is washed in the filter with a very small portion of low boiling (60°–90° C.) petroleum naphtha and then dried in a vacuum mixer or in an inert atmosphere. The yield is about 40% of the crude rosin acids for this single crystallization. The product is a practically white, free-flowing, dry powder consisting of brilliant, uniformly shaped and sized crystals about 0.5 millimeter in diameter. By further evaporating the mother liquor and again cooling and seeding a second batch of crystals is obtained and the filtrate from this crystallization will yield a third batch, so that in all about 80% of the crude rosin acids can be recovered as crystallized abietic acid. In commercial practice the second and third crystallizations are not employed, but the mother liquor from the first crystallization is recycled with the next batch to be crystallized.

(2) The crude rosin acid glass resulting from the complete evaporation of the petroleum naphtha from the 8–10% solution is dissolved in an equal weight of a 92% anhydrous methanol–8% water mixture by refluxing with good agitation. The solution is cooled slowly with continued agitation and some abietic acid seed crystals are added when the batch temperature is between 50° and 55° C. The cooling is continued uniformly down to 15°–20° C. over a time of about 6 hours. The resulting thick slurry is filtered and the cake washed well with 92% methanol. The product is dried in a vacuum mixer or in an inert atmosphere. The yield of pale buff, dry, free flowing abietic acid crystals is about 65% of the crude rosin acids.

The characteristics of the abietic acid crystallized from the crude rosin acids by both of the foregoing methods are given below.

TABLE III

*Characteristics of crystalline abietic acid*

| | From Naphtha | From 92% Methanol |
|---|---|---|
| Melting point range | 150°–158° C. | 135°–142° C. |
| Color of fused Material (rosin scale) | X | N to W. |
| Color of dry crystals | White | Very pale buff. |
| Acid value | 182–185 | 180–185. |
| Iodine value (Hanus) | 155–165 | 155–165. |
| Odor | Faintly woody | Faintly woody. |

In place of secondary amyl alcohol we may use other solvents, such as isopropyl, secondary butyl, tertiary butyl, and tertiary amyl alcohols, hexyl alcohols, cyclohexanol, petroleum naphthas, benzene, toluene, chlorobenzol, dichlorethylene, and acetone, as well as various mixtures of these solvents with each other or with suitable proportions of other materials such as with very small amounts of methyl and ethyl alcohols or the like. Likewise, other suitable acids may be used in place of sulphuric.

In the recovery of the rosin acids as rosinated described specifically with the use of 4% NaOH solution, I have found that other alkalis and ratios may be employed. The temperature of the rosinate solution affects, to some extent, the choice of the strength of the alkali solution as well as the amount used in excess but, in general, I prefer to use an aqueous alkali solution containing about 2–5% alkali, by weight, and in an amount equivalent to about 1.1-2.0 times that corresponding to the acid value of the naphtha solution.

Instead of starting with black liquor soap, I may use unrefined, semi-refined or refined talloel to obtain the desired results and the use of such materials is included in the present process.

It will be apparent that the present invention is susceptible to many variations and changes other than those noted, the latitude of change and scope of invention being limited only as defined in the appended claims.

This is a continuation-in-part of my copending application Serial No. 441,219, filed April 30, 1942, now abandoned, as well as of the Christmann and Houpt Patent No. 2,285,902 mentioned above.

I claim:

1. In a process of separating the fatty acid soaps of black liquor soap from the rosin acids by forming a hot, substantially anhydrous solution of fatty acids, rosin acids and an amount of alkali sufficient to neutralize only the fatty acids in an alcoholic organic solvent in which the alkali soaps of the fatty acids are soluble hot but not cold, and in which the rosin acids are soluble hot and cold, and, after cooling said solution to precipitate the major proportion of the soaps of the fatty acids which are then separated from the alkaline mother liquor, the steps which comprise adding to the mother liquor sulphuric acid diluted with anhydrous alkyl alcoholic organic solvent in an amount at least 0.25% but not more than about 5% in excess of that required to neutralize the alkalinity of the mother liquor, heating the acidified mother liquor to esterify residual fatty acids with the anhydrous alcoholic organic solvent and to isomerize rosin acids to crystallizable forms, removing the solvent by distillation, dissolving the rosin acids from the still residue in naphtha and recovering the rosin acids from the resulting naphtha solution.

2. In a process of separating the fatty acid soaps of black liquor soap from the rosin acids by forming a hot, substantially anhydrous solution of fatty acids, rosin acids and an amount of alkali sufficient to neutralize only the fatty acids in an alcoholic organic solvent in which the alkali soaps of the fatty acids are soluble hot but not cold, and in which the rosin acids are soluble hot and cold, and, after cooling said solution to precipitate the major proportion of the soaps of the fatty acids which are then separated from the alkaline mother liquor, the steps which comprise adding to the mother liquor sulphuric acid diluted with anhydrous alkyl alcoholic organic solvent in an amount at least 0.25% but not more than about 5% in excess of that required to neutralize the alkalinity of the mother liquor, heating the acidified mother liquor to esterify residual fatty acids with the anhydrous alcoholic organic solvent and to isomerize rosin acids to crystallizable forms, removing the solvent by distillation, dissolving the rosin acids from the still residue in naphtha, adding to the resulting naphtha solution dilute aqueous alkali in an amount 1.1-2.0 times that equivalent to the acid present, separating the naphtha from the aqueous rosinate solution, acidifying the rosinate solution to precipitate rosin acids, dissolving the last-named rosin acids as a super-saturated solution in a hot organic solvent and crystallizing the rosin acids from said saturated solution by cooling and seeding.

3. In a process of separating the fatty acid soaps of black liquor soap from the rosin acids by forming a hot, substantially anhydrous solution of fatty acids, rosin acids and an amount of alkali sufficient to neutralize only the fatty acids in secondary amyl alcohol in which the alkali soaps of the fatty acids are soluble hot but not cold, and in which the rosin acids are soluble hot and cold, and after cooling said solution to precipitate the major proportion of the soaps of the fatty acids which are then separated from the alkaline mother liquor, the steps which comprise adding to the mother liquor sulphuric acid diluted with anhydrous alcoholic organic solvent in an amount at least 0.25% but not more than about 5% in excess of that required to neutralize the alkalinity of the mother liquor, heating the acidified mother liquor to esterify residual fatty acids with the amyl alcohol and to isomerize rosin acids to crystallizable forms, removing the unesterified alcohol by distillation, washing the still residue with cool water to remove salts and excess acid, dissolving the rosin acids from the still residue in naphtha and recovering the rosin acids from the naphtha solution.

4. In a process of separating the fatty acid soaps of black liquor soap from the rosin acids by forming a hot, substantially anhydrous solution of fatty acids, rosin acids and an amount of alkali sufficient to neutralize only the fatty acids in secondary amyl alcohol in which the alkali soaps of the fatty acids are soluble hot but not cold, and in which the rosin acids are soluble hot and cold, and, after cooling said solution to precipitate the major proportion of the soaps of the fatty acids which are then separated from the alkaline mother liquor, the steps which comprise adding to the mother liquor sulphuric acid diluted with anhydrous alcoholic organic solvent in an amount at least 0.25% but not more than about 5% in excess of that required to neutralize the alkalinity of the mother liquor, heating the acidified mother liquor to esterify residual fatty acids with the amyl alcohol and to isomerize rosin acids to crystallizabe forms, removing the unesterified alcohol by distillation, washing the still residue with cool water to remove salts and excess acid, dissolving the rosin acids from the still residue in naphtha, adding to the resulting naphtha solution dilute aqueous sodium hydroxide (4% solution) in an amount about 1.6 times that equivalent to the acid present, separating the naphtha from the aqueous rosinate solution, acidifying the rosinate solution to precipitate rosin acids, dissolving the last-mentioned rosin acids as a super-saturated solution in a hot organic solvent and crystallizing the rosin acids from said saturated solution by cooling and seeding.

ALFRED G. HOUPT.

No references cited.